United States Patent [19]
Barker et al.

[11] Patent Number: 5,291,602
[45] Date of Patent: Mar. 1, 1994

[54] METHOD AND SYSTEM FOR DYNAMIC MODIFICATION OF DATA STREAM CONSTRUCTS BY SELECTIVELY DETERMINING WHICH PARAMETERS OF A MACRO DEFINITION STORED IN ASSOCIATION WITH THE DATA STREAM CONSTRUCT MAY BE MODIFIED

[75] Inventors: Barbara A. Barker, Round Rock; Thomas R. Edel, Austin; Jeffrey A. Stark, Grapevine, all of Tex.

[73] Assignee: International Business Machines Corporation, Armonk, N.Y.

[21] Appl. No.: 81,905

[22] Filed: Jun. 23, 1993

Related U.S. Application Data

[63] Continuation of Ser. No. 395,873, Aug. 18, 1989, abandoned.

[51] Int. Cl.⁵ .............................................. G06F 5/01
[52] U.S. Cl. .................................. 395/700; 395/148; 395/600; 395/775; 364/DIG. 2; 364/943; 364/943.44
[58] Field of Search ................ 395/148, 600, 700, 775

[56] References Cited

U.S. PATENT DOCUMENTS

| | | | |
|---|---|---|---|
| 4,218,756 | 8/1980 | Fraser | 364/900 |
| 4,553,205 | 11/1985 | Porchia | 364/200 |
| 4,751,740 | 6/1988 | Wright | 364/900 |
| 4,833,594 | 5/1989 | Familetti et al. | 364/200 |
| 4,949,253 | 8/1990 | Chigira et al. | 364/200 |
| 4,969,093 | 11/1990 | Barker et al. | 364/900 |

OTHER PUBLICATIONS

Ralston et al., Encyclopedia of Computer Science, 1976, pp. 835-837, 1360-1366.

*Primary Examiner*—Thomas C. Lee
*Assistant Examiner*—John C. Loomis
*Attorney, Agent, or Firm*—Andrew J. Dillon

[57] ABSTRACT

A method and system are disclosed which permits the self modification of data stream constructs by the utilization of one or more macro definitions, each of which includes a plurality of parameters, at least one of which is modifiable. A modify parameter structured field is included within a selected macro definition and identifies a particular parameter within the macro definition which may be modified. Subsequent invocation of the macro definition may include selective identification of a parameter to be modified. If the identified parameter has been specified as modifiable by the macro definition, the parameter is modified and the macro definition is thereby altered. In this manner the present method permits the utilization of a single macro definition by multiple processes within a data stream.

5 Claims, 6 Drawing Sheets

MACRO DEFINITION

BEGIN MACRO (EXAMPLE)

DATA STREAM COMMAND (SF1)
    MODIFY PARAMETER VALUE (SF2)
        <SET PARAMETER (A,$\emptyset$1)(B,$\emptyset$2)>

DATA STREAM COMMAND (SF3)
        <PARM 1, POS $\emptyset$1, VALUE 1>
        <PARM 2, POS $\emptyset$2, VALUE 2>
        <PARM 3, POS $\emptyset$3, VALUE 3>

DATA STREAM COMMAND (SF4)
    MODIFY PARAMETER VALUE (SF5)
        <SET PARAMETER (K,$\emptyset$2)>

MODIFY PARAMETER VALUE (SF6)
        <SET PARAMETER (I,$\emptyset$1)>
        <SET PARAMETER (K,$\emptyset$2)>

DATA STREAM COMMAND (SF7)
        <PARM 1, POS $\emptyset$1, VALUE i>
        <PARM 2, POS $\emptyset$2, VALUE j>
        <PARM 3, POS $\emptyset$3, VALUE k)>

END MACRO

*Fig. 2*

DATA STREAM

BEGIN DATA STREAM
    .
    .

INVOKE MACRO (EXAMPLE)
        <PASS PARAMETER (A, VALUE X)(B, VALUE Y)>
        <PASS PARAMETER (K, J)(J, VALUE n)>
    .
    .

END DATA STREAM

*Fig. 3*

MODIFIED MACRO DEFINITION

BEGIN MACRO (EXAMPLE)

DATA STREAM COMMAND (SF1)

DATA STREAM COMMAND (SF3)
        <PARM 1, POS 01, VALUE X>
        <PARM 2, POS 02, VALUE Y>
        <PARM 3, POS 03, VALUE 3>

DATA STREAM COMMAND (SF4)

DATA STREAM COMMAND (SF7)
        <PARM 1, POS 01, VALUE i >
        <PARM 2, POS 02, VALUE n)>
        <PARM 3, POS 03, VALUE k )>

END MACRO

*Fig. 4*

SELF-MODIFYING DATA STREAM EXAMPLE

```
BDT                                BEGIN DATA STREAM
 ·
 ·
 ·
  BRG                              BEGIN RESOURCE OBJECT DEFINITIONS
    BMD (A)                          BEGIN MACRO DEFINITION (A)
      MOD (Ø1,Ø4)                      MODIFY PARAMETER VALUE (ID = Ø1, SEG. NO.= 4)
      BRT (···DON)                     BEGIN TEXT OBJECT (PARAMETER=DON IS MODIFIABLE)
       ·                                 ·
       ·                                 ·
       ·                                 ·
      ERT                              END TEXT OBJECT
    EMD                              END MACRO DEFINITION (A)
     ·                                ·
     ·                                ·
     ·                                ·
    BMD (PLACE)                      BEGIN MACRO DEFINITION (PLACE)
      MGO (FIGOBJ, FIGOBJAREA,         MAP GRAPHICS OBJECT (FIGOBJ
           TOP LEFT)                     POSITION (TOP LEFT) OF OBJECT
                                         AREA (FIGOBJAREA)
       ·                                 ·
       ·                                 ·
       ·                                 ·
    EMD                              END MACRO DEFINITION (PLACE)
     ·                                ·
     ·                                ·
     ·                                ·
  ERG                              END RESOURCE OBJECT DEFINITIONS
   ·                                ·
   ·                                ·
   ·                                ·
  BPG                              BEGIN PAGE
   ·                                ·
   ·                                ·
   ·                                ·
    IMA (A)(Ø1, BEN)                 INVOKE MACRO(A) (PASS PARAMETER ID=Ø1, VALUE=BIN)
     ·                                ·
     ·                                ·
     ·                                ·
    TLE (FIG)(POSITION=PLACE)        TAG ELEMENT(FIG)(PROCESS MACRO DEF. PLACE TO POSITION ELEMENT TAGGED FIG.)
     ·                                ·
     ·                                ·
     ·                                ·
  EPG                              END PAGE
   ·                                ·
   ·                                ·
   ·                                ·
EDT                                END DATA STREAM
```

*Fig. 5*

METHOD AND SYSTEM FOR DYNAMIC MODIFICATION OF DATA STREAM CONSTRUCTS BY SELECTIVELY DETERMINING WHICH PARAMETERS OF A MACRO DEFINITION STORED IN ASSOCIATION WITH THE DATA STREAM CONSTRUCT MAY BE MODIFIED

This application is a continuation of application Ser. No. 07/395,873, filed Aug. 18, 1989 now abandoned.

BACKGROUND OF THE INVENTION

1. Technical Field

The present invention relates in general to the field of document data stream manipulation and in particular to the management and processing of data stream constructs in a manner which permits such constructs to be dynamically self-modifiable for use within a structured data stream. Still more particularly, the present invention relates to methods which permit a high degree of flexibility in passing data and processing information from one data stream construct to another.

2. Background Art

The management of a data stream in a digital communications network, such as a Local Area Network (LAN), or larger teleprocessing networks, presents many problems, particularly when it is desired to dynamically alter selectively modifiable parameter information specified within a macro definition for use within a structured data stream. By macro definition, what is meant is a data stream resource that is intended for inclusion in the data stream as if the data stream constructs representing the macro definition had been encountered during data stream processing and interpretation. A macro can be used to specify data and formatting or processing information that is to be associated with any construct within the data stream. A macro definition may be contained within the data stream or stored in an external library.

Certain known systems exist which permit the definition of macros which may be invoked during data stream interpretation to specify data and formatting information to be used in the processing of selected data stream constructs as long as the data stream and parameter constructs representing the macro content definition are static and stored in a macro or subroutine library. However, these systems limit modifiable data in the macro definition to specific parameters which are required to be identified coincident with the definition of the macro, as to type and permitted values. These systems also tightly couple the macro definition with the process invoking the macro thereby restricting the utilization of the macro to a single purpose.

As utilized herein, a data stream is a collection of structured fields and is defined by the syntax and semantics of the structured fields. By syntax, what is meant is the manner in which the structured fields and parameters are grouped independently of their meaning or the manner of their interpretation and use. By semantics, is meant the meaning of the structured fields and the parameters, independently of their interpretation and use. By structured field, what is meant is a command in a data stream composed of one or more parameter groups, each of which specifies a parameter and an associated value selected from an architected defined set of values. Included as one parameter group type is a triplet which is a self-identifying parameter containing a function identifier and one or more parameter groups. The data stream is interpreted to generate a visual or conceptual entity such as a document which may be presented in a format facilitating additional processing, such as document editing format.

The International Standards Organization (ISO) has defined standards for document processing and interchange. Specifically, the Standard Generalized Markup Language (SGML), Publication 8879, and the Office Document Architecture/Office Document Interchange Facility (ODA/ODIF), Publication 8613, are two such standards. Generally, the data streams produced under the ISO standards or by other known application program products in general tend to be complex due to a desire to accommodate as many anticipated processing requirements as possible. Designing an application program to handle all possible user desires generally results in an extremely cluttered data stream. What is needed is a data stream architecture which is uncluttered and which permits data communication among diverse processes so that the data may be manipulated by processes of varying characteristics and intent. More specifically, a mixed object document content architecture is preferred which allows documents to be transmitted among diverse processes achieving consistent interpretations of the content of the data stream. Within such a mixed object document content architecture, what is needed is a standard which unburdens the data stream of the requirement to accommodate many different processing requirements without unduly cluttering the data stream with individual constructs for each requirement.

Recently, a data stream management system has been proposed which utilizes a shell structure which includes processing information which may be utilized to manage and process tagged constructs or elements which are independent of the data content but may appear concurrently with the data in a data stream representation of a document created by an editor or other similar application. The shell structure may be off-line or separate from the data stream, transmitted independently of the data stream, or be included within the data stream. Also, it has been proposed to provide a method whereby such shells may be easily and temporarily modified or redefined by combining various shell fragments, without the necessity of eliminating the original shell structure itself. While these methods represent an advance in the art, it should be apparent that a need exists for a method whereby macros specified for use within the data stream process may be defined with modifiable parameters such that these macros may be utilized more efficiently for multiple purposes.

SUMMARY OF THE INVENTION

It is therefore one object of the present invention to provide an improved data stream management technique.

It is another object of the present invention to provide an improved data stream management technique wherein selected portions of a data stream may be defined to be dynamically modifiable.

It is yet another object of the present invention to provide an improved data stream management technique which permits portions of a data stream to be dynamically modified by controls within the data stream and thereafter reutilized, thereby permitting efficient utilization and improved processing of the data stream.

The foregoing objects are achieved as is now described. The method of the present invention permits the self modification of data stream constructs by the utilization of one or more macro definitions, each of which includes a plurality of parameters, at least one of which is modifiable. A modify parameter structured field is included within a selected macro definition and identifies a particular parameter within the macro definition which may be modified. Subsequent invocation of the macro definition may include selective identification of a parameter to be modified. If the identified parameter has been specified as modifiable by the macro definition, the parameter is modified and the macro definition is thereby altered. In this manner the present method permits the utilization of a single macro definition by multiple processes within a data stream.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a high level depiction of a macro definition which may be utilized in accordance with the method of the present invention;

FIG. 3 is a high level depiction of a data stream invocation of the macro definition of FIG. 2;

FIG. 4 is a high level depiction of the macro definition of FIG. 2 after modification in accordance with the method of the present invention;

FIG. 5 is a high level depiction of a self-modifying data stream in accordance with the method of the present invention;

DETAILED DESCRIPTION OF THE PREFERRED EMBODIMENT

Figure 1:
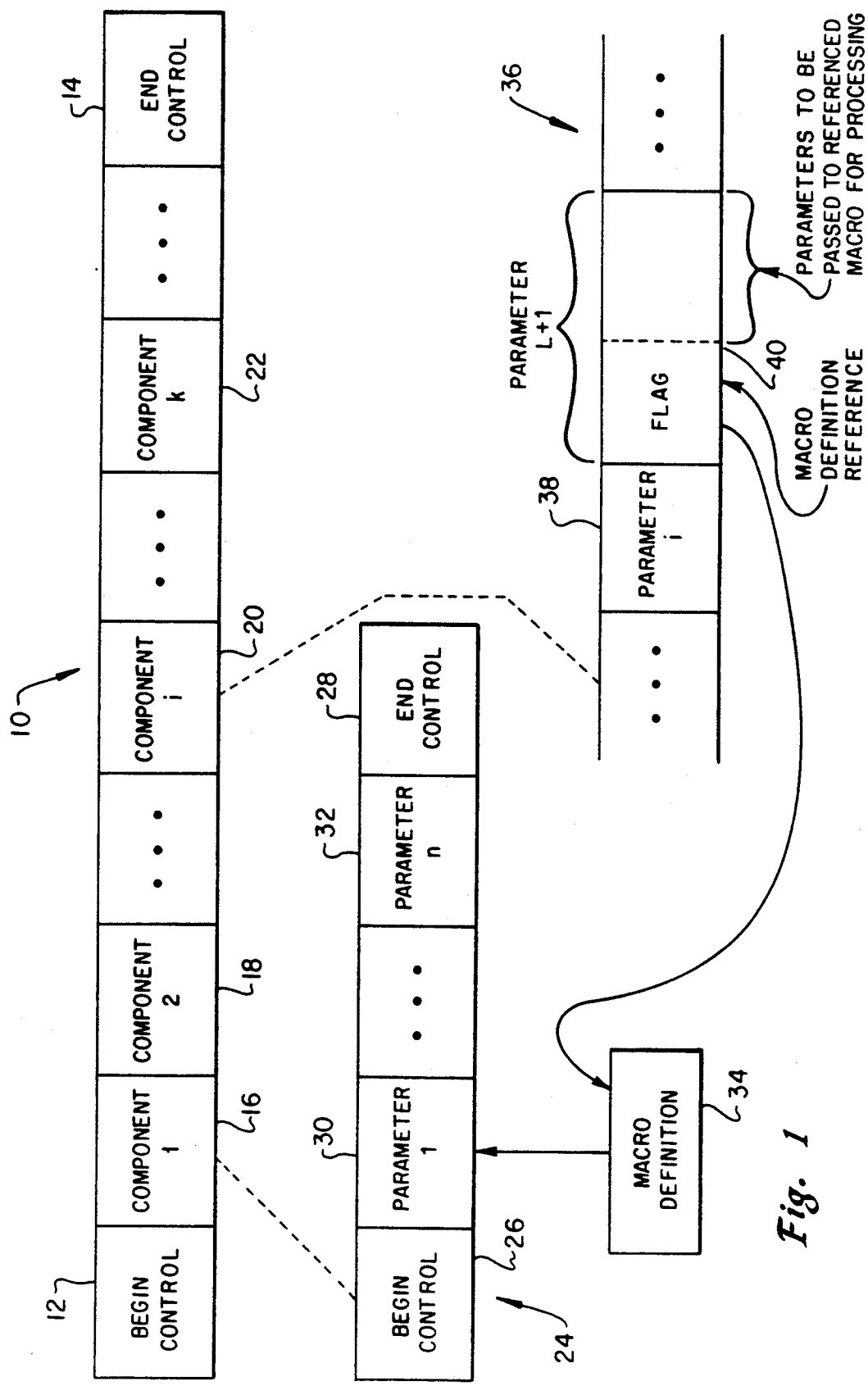
FIG. 1 is a graphic depiction of a data stream including self-modifying data stream constructs in accordance with the method of the present invention.

With reference now to the figures and in particular with reference to FIG. 1, there is depicted a graphic representation of a data stream 10 which includes self-modifying constructs in accordance with the method of the present invention. As may be seen, data stream 10 begins with a begin control 12 and ends with an end control 14. Dispersed throughout data stream 10 are a plurality of components, examples which are labeled 16, 18, 20 and 22. As is illustrated, component 16 is comprised of a plurality of data stream constructs labeled 24. This plurality of constructs includes a begin control command 26 and an end control command 28 and a plurality of parameters included therewith such as parameter 30 and parameter 32.

In accordance with an important aspect of the present invention, it may be seen that parameter 30 is derived from macro definition 34. That is, macro definition 34 contains a group of fixed or variable length parameters or parameter groups which describe and control the manner in which data is to be interpreted to modify or create parameter 30.

In a similar manner, the processing of data stream 10 will eventually reach component 20 contained therein. The processing of component 20 will then initiate the processing of data stream constructs 36, which also include multiple parameters. In accordance with the method of the present invention, the processing of parameter 40 will cause certain constructs within data stream 10 to be modified. This is accomplished by including a flag or other reference to macro definition 34 within parameter 40. Also included within parameter 40, in addition to the reference to macro definition 34, are a series of parameters which are to be passed to the referenced macro definition for processing therein. The passing of these parameters to macro definition 34 will serve to modify certain of the parameters within macro definition 34, thus permitting macro definition 34 to be utilized in a different manner to create or modify additional parameters.

In this manner, in accordance with the method of the present invention, it is possible to provide self-modifying data stream constructs by providing one or more macro definitions which include multiple parameters, at least one of which is modifiable. Thereafter, the macro definition may be invoked one or more times, altering which of the parameters within the macro definition are modifiable in conjunction with each invocation. In this matter, a single macro definition may be utilized repeatedly within data stream 10 to generate different results or for different purposes.

Referring now to FIG. 2, there is depicted a high level representation of a macro definition which has been constructed in accordance with the method of the present invention. As may be seen, the macro definition begins with a begin macro command. The macro definition depicted in FIG. 2 is entitled "Example." Thereafter, a Data Stream Command (SF1) is included. Next, a Modify Parameter Value (SF2) is included which identifies two parameters within the next structured field which are modifiable within the macro definition. These parameters are identified as parameter "A" and parameter "B." The position of each parameter in the structured field which follows the Modify Parameter Value Command is determined by the physical ordering and byte offset of the parameters within the structured field. Namely, parameter "Parm 1" is located at position (byte-offset) "Pos 01" and parameter "Parm 2" is located at position (byte-offset) "Pos 02."

As may be seen, the macro definition next includes another Data Stream Command (SF3) which identifies three parameters, their positions and values. Another Data Stream Command (SF4) is now included followed by a second Modify Parameter Value Command (SF5). This second Modify Parameter Value Command identifies parameter "K" located at position "02" as a parameter which is modifiable. Next, a second Modify Parameter Value Command (SF6) is included. As stated above, a Modify Parameter Value Command is always applied to the next structured field within the macro definition. In this manner, one Modify Parameter Value Command may be applied to a second Modify Parameter Value Command, which may be applied to a subsequent Modify Parameter Value Command. Thus, the parameters within the macro definition may be modified as the result of applying one or more Modify Parameter Value Commands. Finally, Data Stream Command (SF7) is included, identifying three parameters within the macro definition. Thereafter, the macro definition ends.

Referring now to FIG. 3, there is depicted a high level representation of the invocation of the macro definition of FIG. 2. As may be seen, the macro definition is invoked within the data stream by an Invoke Macro (Example) Command. Thereafter, a Pass Parameter Value Triplet is included which identifies a specific parameter which is to be modified along with the value which is to be substituted therefor. As may be seen, more than one Pass Parameter Value Command may be included in a single invocation of a macro definition.

Referring now to FIG. 4, there is depicted a high level representation of the macro definition of FIG. 2 after modification during processing of the data stream. As is illustrated; the data stream parameters listed within Data Stream Commands SF3 and SF7 have now been changed in accordance with the Modify Parameter Value Commands of FIG. 2, as modified by the invocation of the macro definition in the manner depicted within FIG. 3. Those skilled in the art should appreciate that by utilizing the method of the present invention, it will be possible to provide a single macro definition which may be invoked a plurality of times, with one or more parameters within the macro definition being modified upon each invocation so that the macro definition may be utilized to dynamically modify one or more constructs within data stream 10 (see FIG. 1).

With reference now to FIG. 5, there is depicted a high level representation of a self-modifying data stream in accordance with the method of the present invention. As may be seen, the data stream begins with a Begin Data Stream Command (BDT) and thereafter, a Begin Resource Object Definition Command (BRG) signifies the beginning of the definition of a plurality of resource objects which will be utilized within the data stream.

The first resource object defined within the example of FIG. 5 is a macro definition entitled "A" which includes a Modify Parameter Value Command (MOD) indicating that the parameter identified as parameter "01" in position "04" is modifiable within macro definition "A." Next, a text object is included which among its other parameters includes the parameter "DON" which is located in a position within the text object indicating that it is the modifiable parameter identified by the Modify Parameter Value Command (MOD) listed above. Thereafter, the text object ends and macro definition "A" also ends.

A subsequent macro definition entitled "PLACE" is also defined within this group of resource object definitions. This macro definition includes a graphics object which identifies a position within the object area into which a graphics object will be mapped. Thereafter, this macro definition also ends and the resource object definitions are terminated.

At this portion of the data stream a Begin Page Command (BPG) is listed and thereafter macro definition "A" is invoked (IMA) along with a Pass Parameter Value (PPV) Triplet indicating that the parameter identified as parameter "01" is to be modified by substituting the value "BEN." In the manner described above, this invocation of macro definition "A" will invoke the macro definition after modifying a parameter contained therein in a manner which will be explained in greater detail herein.

Also included within the page portion of the data stream example is a Tag Logical Element Command (TLE) which identifies the logical element "Figure" and thereafter invokes the macro definition "Place," thereby utilizing that macro definition to position the element tagged "Figure." Thereafter, the page portion of the data stream terminates and subsequently, the data stream itself terminates.

As is illustrated in the foregoing example, at one portion in the data stream the macro definition "A" has been invoked and one of the parameters contained therein has been changed from "DON" to "BEN." Later on in the data stream the macro definition "Place" has been invoked but will be processed in an unmodified manner since that macro definition does not include a Modify Parameter Value (MOD) Command.

Figure 6:
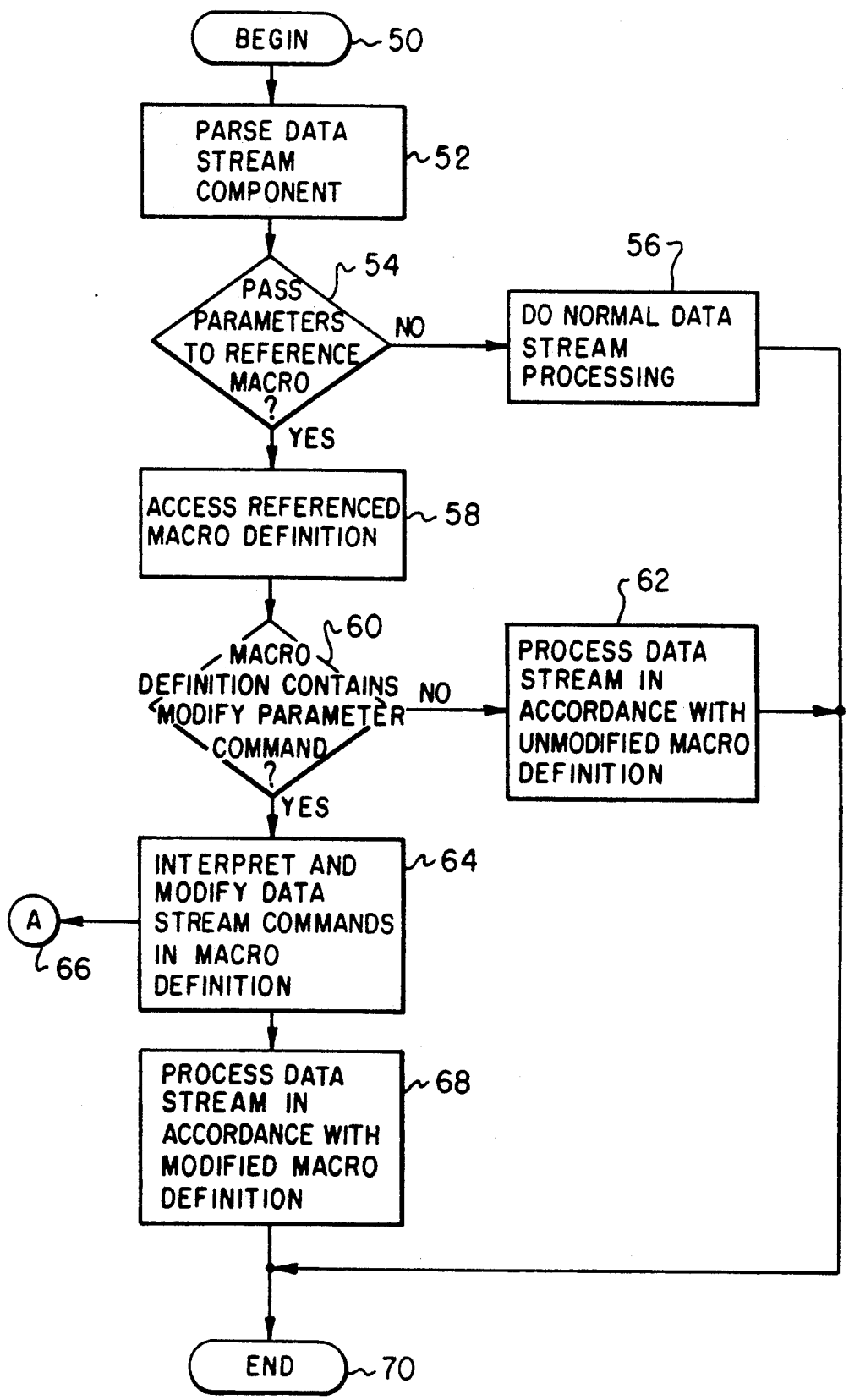
FIG. 6 is a logic flow diagram illustration of the processing of a self-modifying data stream in accordance with the method of the present invention.

Referring now to FIG. 6, there is depicted a logic flow diagram illustrating the processing of a self-modifying data stream in accordance with the method of the present invention. As may be seen, the process begins as illustrated in block 50 and thereafter the data stream components contained within the data stream are parsed, as depicted in block 52. Block 54 is next utilized to determine whether or not a referenced macro definition includes a command to pass parameters and values associated therewith. If not, block 56 depicts the normal data stream processing associated with the known utilization of macro definitions within a data stream and the process terminates thereafter, as illustrated in block 70.

In the event the referenced macro definition includes a command to pass parameters and values associated therewith, block 58 depicts the accessing of the referenced macro definition. Thereafter, the macro definition is examined to determine whether or not it contains a command indicating that selected parameters within this macro definition may be modified. If the macro definition does not contain a command permitting the modification of parameters, as determined by block 60, then the process passes to block 62 which illustrates the processing of the data stream in accordance with the unmodified macro definition. Thereafter, the process again terminates, as illustrated in block 70.

In the event the referenced macro definition does include a command to pass parameters and values associated therewith and the macro definition which is referenced also includes a command permitting the modification of parameters, then the process passes to the subroutine illustrated in block 64 which depicts the interpretation and modification of data stream commands within the macro definition. This process will be described in greater detail herein with reference to FIG. 7.

After modifying the data stream commands contained within the referenced macro definition, in the manner which will be illustrated with reference to FIG. 7, block 68 depicts the processing of the data stream in accordance with the modified macro definition. In this manner, a data stream which is processed in accordance with the method of the present invention may be self-modifying in that it may contain commands which cause selected macro definitions within the data stream to alter the parameters therein so as to permit that macro definition to be utilized to create, modify, or process a different construct within the data stream. Thereafter, the process terminates, as illustrated in block 70.

Figure 7:
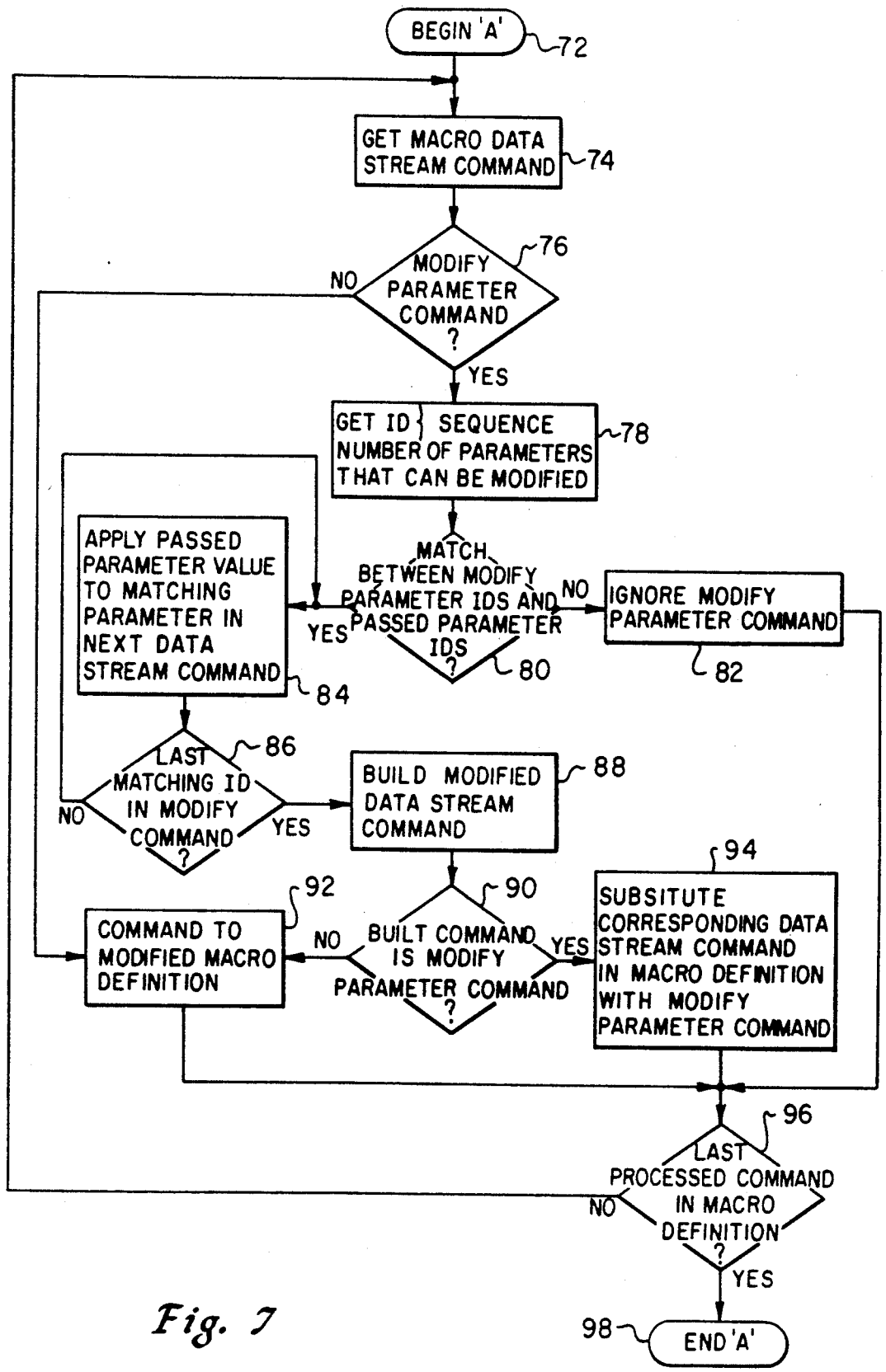
FIG. 7 is a logic flow diagram illustration of the processing of a self-modifying macro definition in accordance with the method of the present invention.

With reference now to FIG. 7, there is depicted the subroutine which is utilized to interpret and modify the data stream commands within the accessed macro definition, as generally indicated at block 64 of FIG. 6. As is illustrated, the process begins at block 72 and thereafter, a macro definition data stream command is retrieved, as depicted in block 74. Block 76 illustrates a determination of whether or not the data stream command retrieved from the macro definition permits modification of parameters in a subsequent data stream command. If not, the process passes to block 92 which illustrates the copying of the data stream command which has been retrieved to the modified macro definition.

Referring again to block 76, if the macro definition data stream command which has been retrieved is identified as a modify parameter command, then block 78 illustrates the obtaining of the identification and sequence number of the parameters within the macro definition which may be modified in accordance with the modify parameter command.

Next, block 80 illustrates a comparison between the parameters listed within the modify parameter command and the parameters listed within the passed parameters included with this invocation of the macro definition. If the comparison indicates that no match exists, then block 82 depicts the ignoring of the modify parameter command. This must be true due to the fact that even though a parameter listed within the macro definition may be modifiable, if it is not the particular parameter which is desired to be modified, as indicated in the passed parameters listed with the invocation, then no modification to the parameter will take place.

Next, if the comparison indicates that the parameter listed within the modify parameter command and the parameter passed do match, block 84 illustrates the applying of the passed parameter value to the matching parameter within the next structured field within the macro definition. Block 86 then illustrates a determination of whether or not the parameter thus matched is the last matching parameter within the modify parameter command. If not, the process recursively returns to block 84 to continue to modify parameters within this data stream command.

After the last parameter within the modify parameter command has been identified, as illustrated in block 86, block 88 then illustrates the building of a modified data stream command within the macro definition, incorporating the modified parameters which have been substituted therein.

Next, block 90 depicts a determination of whether or not the data stream command which has been created above is itself a modify parameter command. If not, the command thus modified is copied to the modified macro definition as illustrated in block 92. However, in the event the modified data stream command which was created in block 88 is a modify parameter command, block 94 illustrates the substitution of the corresponding data stream command within the macro definition with the modify parameter contained within the newly created modified parameter command.

Finally, block 96 illustrates a determination of whether or not the last data stream command within the macro definition has been processed, and if so the process terminates, as illustrated in block 98.

Upon reference to the foregoing those skilled in the art will appreciate that the Applicants in the present application have provided a method whereby highly complex data constructs may be created and transmitted in a structured data stream by utilizing macro definitions to process the data stream which include parameters which may be selectively modified during the processing of the data stream so that the macro definition may be applied in a modified manner.

While the invention has been particularly shown and described with reference to a preferred embodiment, it will be understood by those skilled in the art that various changes in form and detail may be made therein without departing from the spirit and scope of the invention.

We claim:

1. A method in a data processing system for managing a data stream having multiple components which allows a high degree of flexibility in passing data and processing information from one data stream process to another with said data processing system, said method comprising the data processing system implemented steps of:
    establishing a macro definition within said data processing system, said macro definition including a plurality of parameters which are utilized to describe and control the manner in which data is to be interpreted to modify or create a data stream component, wherein at least a selected one of said plurality of parameters is modifiable prior to utilization thereof and wherein all remaining ones of said plurality of a parameters are fixed;
    storing said macro definition in association with said data stream;
    periodically invoking said macro definition during processing of said data stream;
    selectively altering which of said plurality of parameters within said macro definition is modifiable during each invocation thereof; and
    modifying or creating a data stream component utilizing said altered macro definition in response to an invocation thereof wherein a single macro definition may be utilized for multiple purposes.

2. The method in a data processing system for managing a data stream which allows a high degree of flexibility in passing data and processing information from one data stream process to another within said data processing system according to claim 1, wherein said step of selectively altering which of said parameters is modifiable in association with at least one invocation of said macro definition comprises the step of specifying said modifiable parameter during invocation of said macro definition.

3. The method in a data processing system for managing a data stream which allows a high degree of flexibility in passing data and processing information from one data stream process to another within said data processing system according to claim 2, further including the step of establishing at least one structured field within said macro definition identifying which of said plurality of parameters may be modified.

4. The method in a data processing system for managing a data stream which allows a high degree of flexibility in passing data and processing information from one data stream process to another within said data processing system according to claim 3, further including the step of comparing said specified modifiable parameter with said identified parameter within said at least one structured field to determine if said specified modifiable parameter may be modified.

5. A data processing system for managing a data stream having multiple components which allows a high degree of flexibility in passing data and processing information from one data stream process to another within said data processing system, said data processing system comprising:

means for establishing a macro definition within said data processing system, said macro definition including a plurality of parameters which are utilized to describe and control the manner in which data is to be interpreted to modify or create a data stream component, wherein at least a selected one of said plurality of parameters is modifiable prior to utilization thereof and wherein all remaining ones of said plurality of a parameters are fixed.

means for storing said macro definition in association within said data stream;

means for periodically invoking said macro definition during processing of said data stream;

means for selectively altering which of said plurality of parameters within said macro definition is modifiable during each invocation thereof; and means for modifying or creating a data stream component utilizing said altered macro definition in response to an invocation thereof wherein a single macro definition may be utilized for multiple purposes.

* * * * *